(12) United States Patent
Zhong

(10) Patent No.: US 10,483,877 B2
(45) Date of Patent: Nov. 19, 2019

(54) ONE-DIMENSIONAL LARGE-STROKE PRECISE POSITIONING PLATFORM

(71) Applicant: SOOCHOW UNIVERSITY, Suzhou (CN)

(72) Inventor: Bowen Zhong, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 366 days.

(21) Appl. No.: 15/549,248

(22) PCT Filed: Sep. 21, 2015

(86) PCT No.: PCT/CN2015/090073
§ 371 (c)(1),
(2) Date: Aug. 7, 2017

(87) PCT Pub. No.: WO2017/031800
PCT Pub. Date: Mar. 2, 2017

(65) Prior Publication Data
US 2018/0097457 A1     Apr. 5, 2018

(30) Foreign Application Priority Data
Aug. 26, 2015   (CN) .......................... 2015 1 0530696

(51) Int. Cl.
*H02N 2/02*     (2006.01)
*G12B 5/00*    (2006.01)

(52) U.S. Cl.
CPC ................ *H02N 2/02* (2013.01); *G12B 5/00* (2013.01)

(58) Field of Classification Search
CPC ....................................................... H02N 2/02
(Continued)

(56) References Cited

U.S. PATENT DOCUMENTS

| | | | | |
|---|---|---|---|---|
| 7,745,963 B2 * | 6/2010 | Jenny | .................... | H02K 41/02 310/12.01 |
| 8,912,707 B2 * | 12/2014 | Hwu | ...................... | G01O 10/04 310/328 |

(Continued)

FOREIGN PATENT DOCUMENTS

| | | |
|---|---|---|
| CN | 101702329 A | 5/2010 |
| CN | 203179557 U | 9/2013 |

(Continued)

*Primary Examiner* — Gary A Nash
(74) *Attorney, Agent, or Firm* — SZDC Law P.C.

(57) ABSTRACT

A one-dimensional large-stroke precise positioning platform includes a housing, a cross ball guiding rail, piezoelectric ceramic and an elastic member. The cross ball guiding rail includes a mover guiding rail and stator guiding rails. A first and second fixing member is movable in a containing chamber provided in the housing. In the longitudinal direction of the mover guiding rail, one end of the piezoelectric ceramic is abutted against the first fixing member, and the other end against the second fixing member. The mover guiding rail is fixed on the second fixing member, and the elastic member is fixed on the first fixing member. In the width direction of the mover guiding rail, the two sides of the elastic member are abutted against the inner side surfaces of the containing chamber, and the first fixing member is connected with the second fixing member by a flexible member.

10 Claims, 8 Drawing Sheets

(58) Field of Classification Search
USPC .............................. 310/12.01, 12.03, 12.06
See application file for complete search history.

(56) References Cited

U.S. PATENT DOCUMENTS

| | | | | |
|---|---|---|---|---|
| 2005/0054468 | A1* | 3/2005 | Nagai | F16C 29/063 |
| | | | | 474/148 |
| 2006/0196255 | A1* | 9/2006 | Hama | G01B 5/0009 |
| | | | | 73/105 |
| 2012/0187309 | A1* | 7/2012 | Krechting | B82Y 10/00 |
| | | | | 250/453.11 |

FOREIGN PATENT DOCUMENTS

| | | |
|---|---|---|
| CN | 203251240 U | 10/2013 |
| CN | 104467525 A | 3/2015 |
| CN | 104767421 A | 7/2015 |
| CN | 205029575 U | 2/2016 |

\* cited by examiner

ONE-DIMENSIONAL LARGE-STROKE PRECISE POSITIONING PLATFORM

The present application is a National Stage Application of PCT/CN2015/090073, filed on Sep. 21, 2015, which claims the priority of China Patent Application Ser. No. 201510530696.3, filed on Aug. 26, 2015 and entitled "one-dimensional large-stroke precise positioning platform," each of which is incorporated by reference for all purposes as if fully set forth herein.

FIELD OF THE INVENTION

The present invention relates to a one-dimensional large-stroke precise positioning platform, belonging to the field of micro-nano technology.

DESCRIPTION OF THE RELATED ART

Nanotechnology is one of the basic means for human exploring, recognizing, modifying and utilizing the microscopic world, wherein nano-manipulation is an important aspect of nanotechnology, and is a hot research area concerned widely in the fields of international robotics and nanotechnology. Efficient, precise and controllable nano-manipulation system has a very promising application prospect in the fields of optoelectronic information technology and medical technology. Automatically and precisely manipulating nanometer-scale objects or materials is one of the necessary means in nano-manipulation system. Currently, in the field of important scientific Engineering, such as Microsystems Engineering, Biological Engineering, Medical Engineering, Precision Manufacturing, Aeronautics and Astronautics, it is required that a positioning platform can achieve high precise positioning and operating in limited operating space and have large operating range. Cross-scale nano-positioning technology having mirco-nano scale positioning precision, millimeter-scale stroke and small volume has become key technology that must be solved in nanometer-scale operation. However, the electromechanical system utilizing servo motor drive and precise lead screw transmission cannot meet the requirements. In recent years, Micro-drive technology taking a piezoelectric ceramic as a drive source has been gradually developed. The piezoelectric ceramic has many excellent properties, such as small size, high frequency response, little heat generation, large output force, no noise, stable performance and the like. The transmission mechanism includes a flexible hinge, which has no mechanical friction, no clearance, and also has high motion sensitivity, thereby sufficiently meet the requirements of the micro-nano positioning. Generally the cross-scale precise positioning drivers based on piezoelectric ceramics mainly includes: inchworm driver, piezoelectric ultrasonic motor, piezoelectric harmonic driver, macro and micro hybrid driver. By analyzing and studying on the movement principle and structure of existing various cross-scale drivers, it is found that the inchworm driver has low movement speed and requires a stack of piezoelectric ceramics, and has high machining precision requirement and complicated structure. The piezoelectric ultrasonic motor has low efficiency, and the usage life of the motor is greatly affected by friction and wear. The piezoelectric harmonic driver has low resolution, and is not applicable in the situation that needs sub-nanometer precision and nanometer precision. There are various types of macro and micro hybrid drivers, however, they have a complicated structures, high cost and complicated drive control systems.

SUMMARY OF THE INVENTION

The object of the present invention is to provide a one-dimensional large-stroke precise positioning platform, which has high precision, desirable consistency, low friction, stable performance and strong bearing capacity.

To achieve the above purpose, the present invention utilizes the following technical solution:

A one-dimensional large-stroke precise positioning platform, includes:

a housing;

a cross ball guiding rail arranged at one side of the housing, the cross ball guiding rail including a mover guiding rail and stator guiding rails oppositely arranged at two sides of the mover guiding rail, wherein the stator guiding rails is parallel to the mover guiding rail, and the stator guiding rails is fixed on the housing a piezoelectric ceramic and an elastic member disposed within the housing;

a containing chamber disposed within the housing for containing the piezoelectric ceramic and the elastic member, wherein a first fixing member and a second fixing member are provided in the containing chamber, and the first fixing member and the second fixing member are movable in the containing chamber along the longitudinal direction of the mover guiding rail;

wherein in the longitudinal direction of the mover guiding rail, one end of the piezoelectric ceramic is abutted against the first fixing member, and the other end of the piezoelectric ceramic is abutted against the second fixing member, the mover guiding rail is fixed on the second fixing member, and the elastic member is fixed on the first fixing member;

in the width direction of the mover guiding rail, the two sides of the elastic member are abutted against the inner side surfaces of the containing chamber, and the first fixing member is connected with the second fixing member by a flexible member.

Preferably, the piezoelectric ceramic has a first abutment surface for abutting against the first fixing member and a second abutment surface for abutting against the second fixing member, a pre-tensioning screw is provided at one side of the piezoelectric ceramic for abutting against the first abutment surface or the second abutment surface.

Preferably, a gasket is clamped between the pre-tensioning screw and the piezoelectric ceramic.

Preferably, the pre-tensioning screw is threadedly connected on the second fixing member, and the gasket is clamped between the pre-tensioning screw and the second abutment surface of the piezoelectric ceramic.

Preferably, in the height direction of the stator guiding rail, a mounting hole and an adjusting hole are opened at the two opposite sides of the elastic member respectively, and the first fixing member is provided with a positioning screw installed in the mounting hole and an adjustment screw installed in the adjusting hole thereon.

Preferably, the first fixing member includes a first frame and a first hollow cavity formed in the first frame, the elastic member is contained in the first hollow cavity, the first fixing member is provided with an abutment portion for abutting against the piezoelectric ceramic, the abutment portion includes a protrusion protruding from the first frame towards the piezoelectric ceramic, the flexible member is provided on the abutment portion.

Preferably, the flexible member is a plate extending outwards from the side surface of the abutment portion.

Preferably, the second fixing member includes a second frame and a second hollow cavity formed in the second frame, the piezoelectric ceramic is contained in the second hollow cavity, the second frame includes a top wall and a bottom wall opposite to each other and two side walls extending downwards from the top wall, the second frame has an opening facing the first frame, the abutment portion extends from the opening into the second hollow cavity.

Preferably, there are two plates which extend outwards from the two side surfaces of the abutment portion, and the two plates are connected with the two side walls of the second frame respectively.

Preferably, the housing includes an upper end wall and a lower end wall opposite to each other, the stator guiding rail is fixed on the upper end wall on which a channel is opened, the mover guiding rail is located above the channel, a through hole is opened on the lower end wall and the through hole is in communication with the containing chamber.

The present intention has the following advantages: by employing the cooperation among the cross ball guiding rail, the elastic member and the piezoelectric ceramic, as well as the connection via a flexible member, the one-dimensional large-stroke precise positioning platform can solve the problems such as poor step consistency, losing step, low retention force, movement performance greatly affected by load and the like in the existing precise positioning platforms, and thus has the advantages of high precision, desirable consistency, low friction, stable performance and strong bearing capacity.

DETAILED DESCRIPTION OF THE PREFERRED EMBODIMENTS

Figure 1:
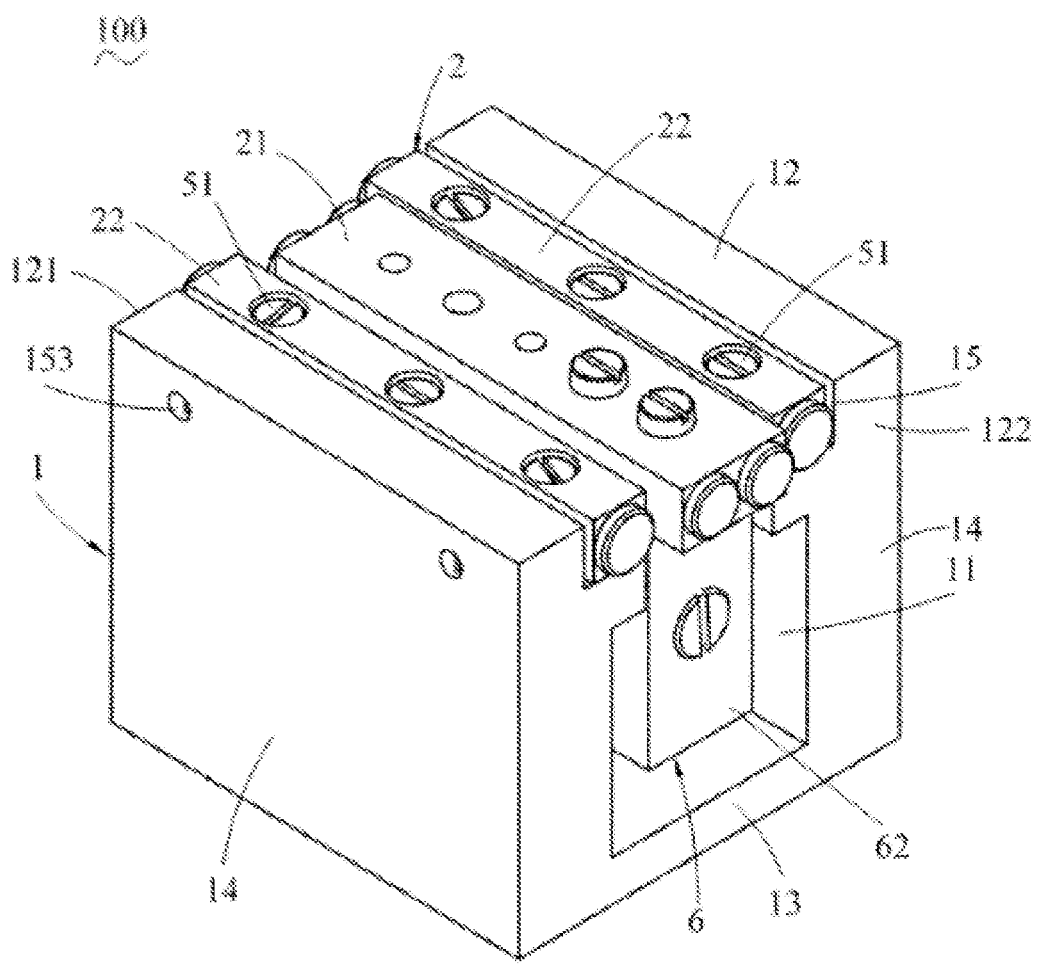
FIG. 1 is a schematic view of a one-dimensional large-stroke precise positioning platform according to the present invention.
Figure 2:
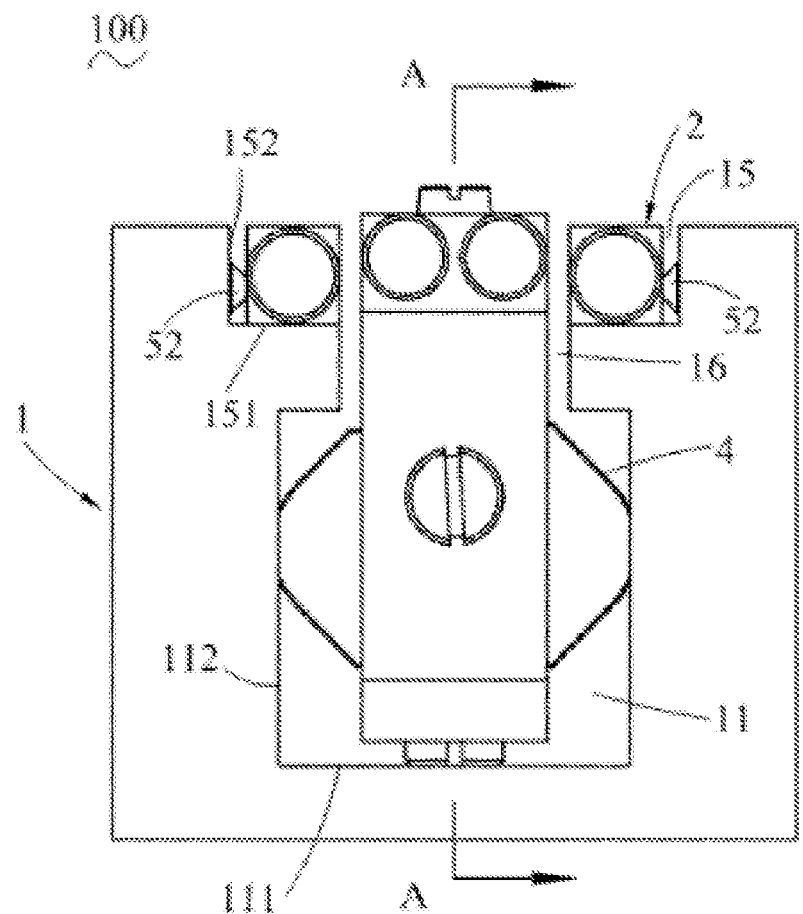
FIG. 2 is a front view of FIG. 1.
Figure 3:
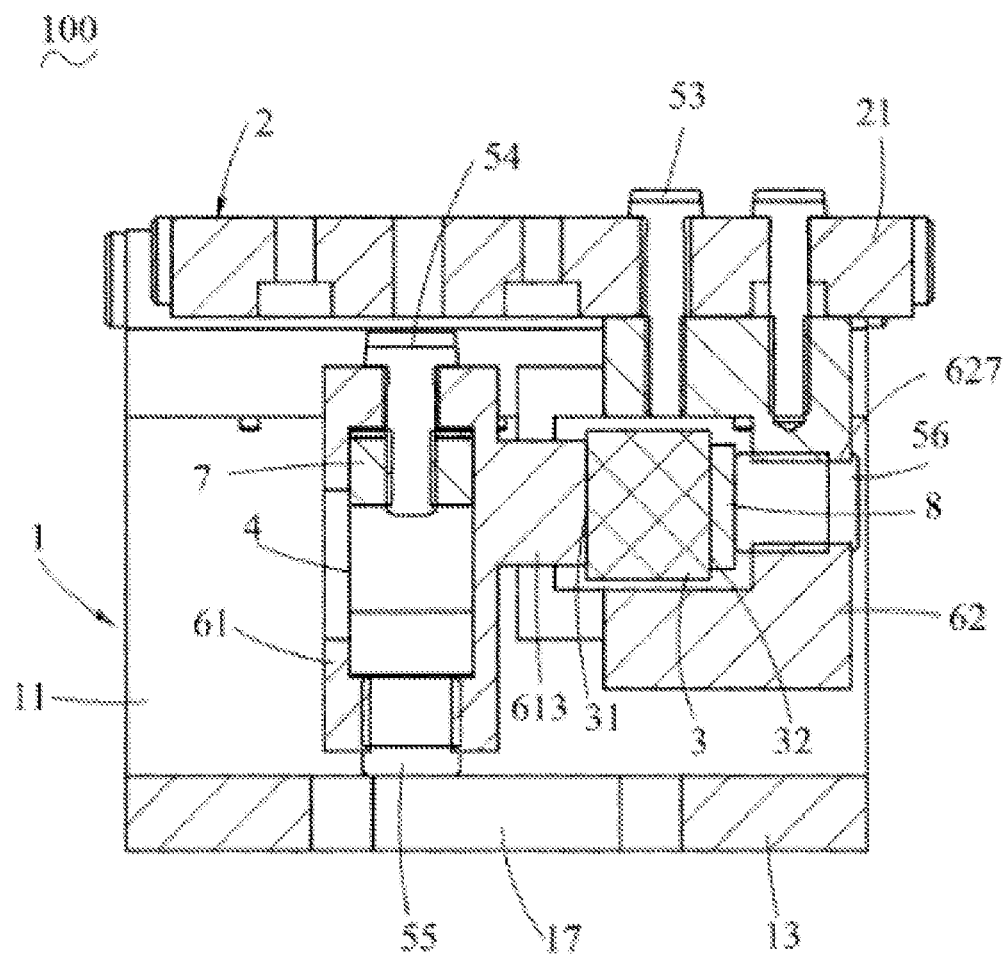
FIG. 3 is a sectional view taken along A-A in FIG. 2.
Figure 4:
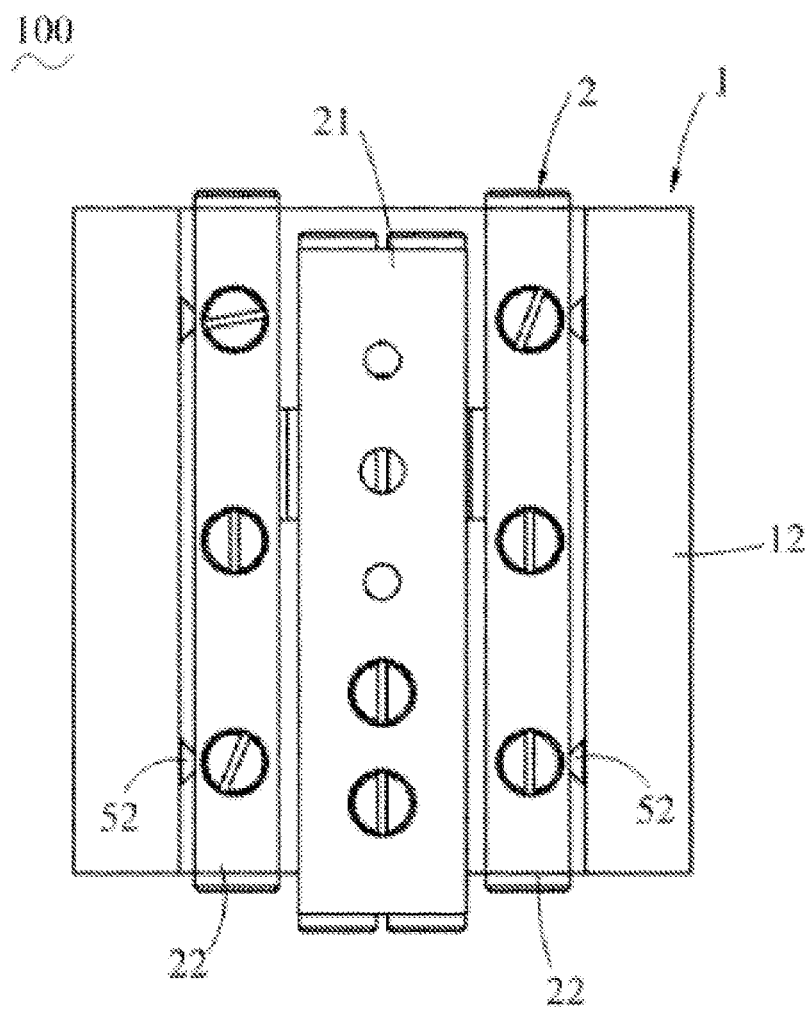
FIG. 4 is a top view of FIG. 1.
Figure 5:
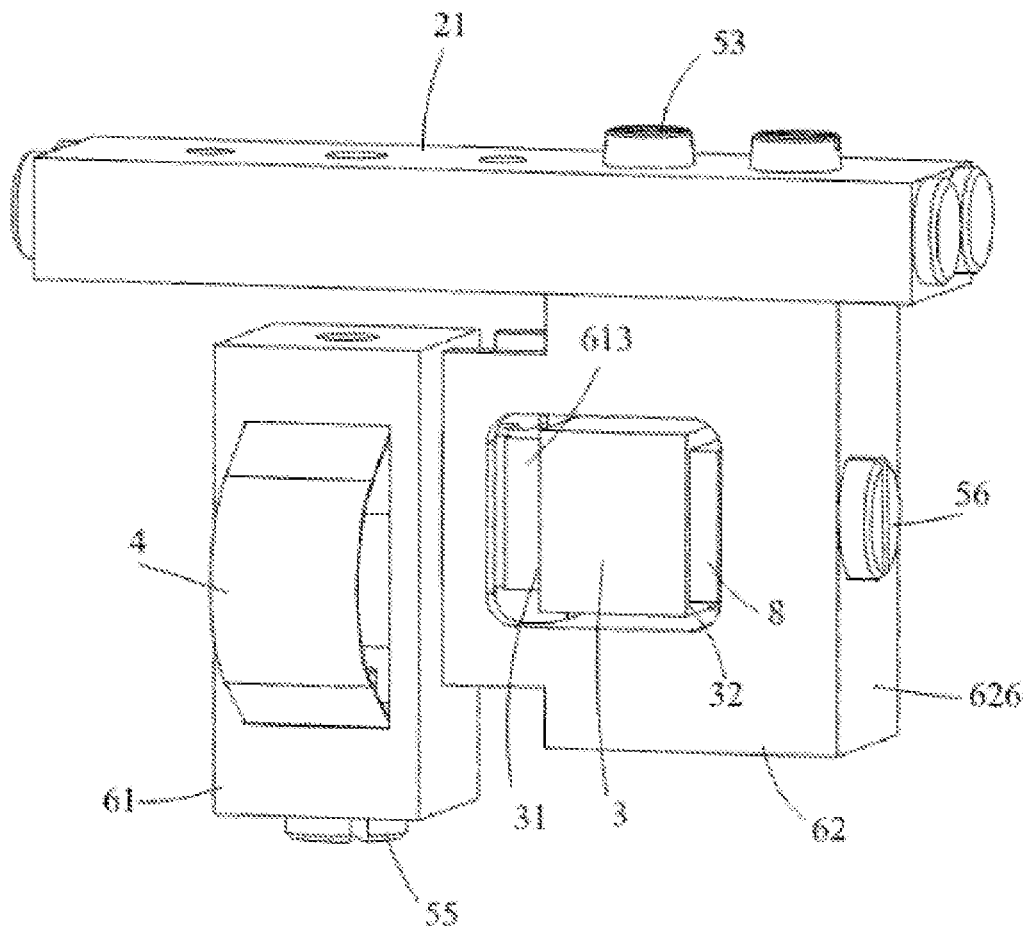
FIG. 5 is a view partially showing the structure of FIG. 1.
Figure 6:
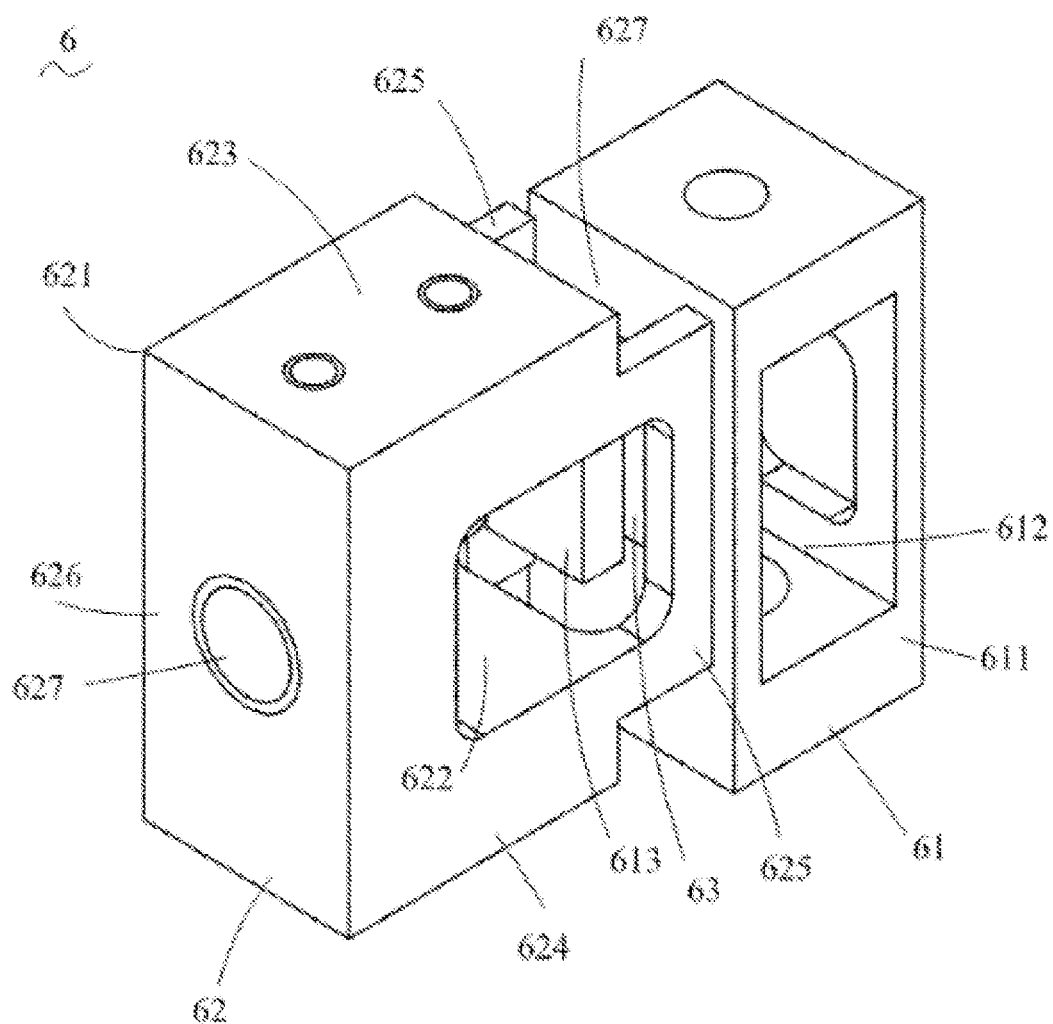
FIG. 6 is a schematic view of a flexible frame in FIG. 5.
Figure 7:
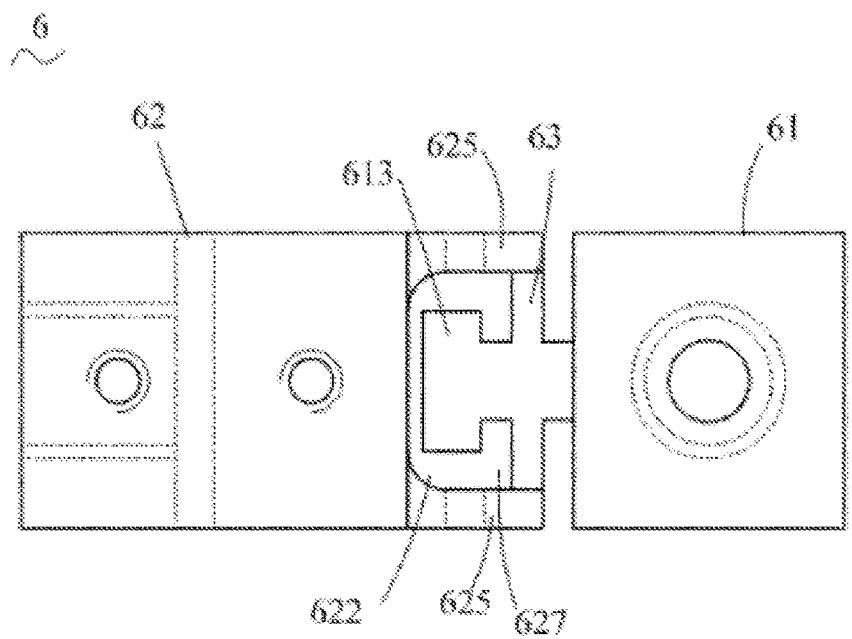
FIG. 7 is a top view of FIG. 6.
Figure 8:
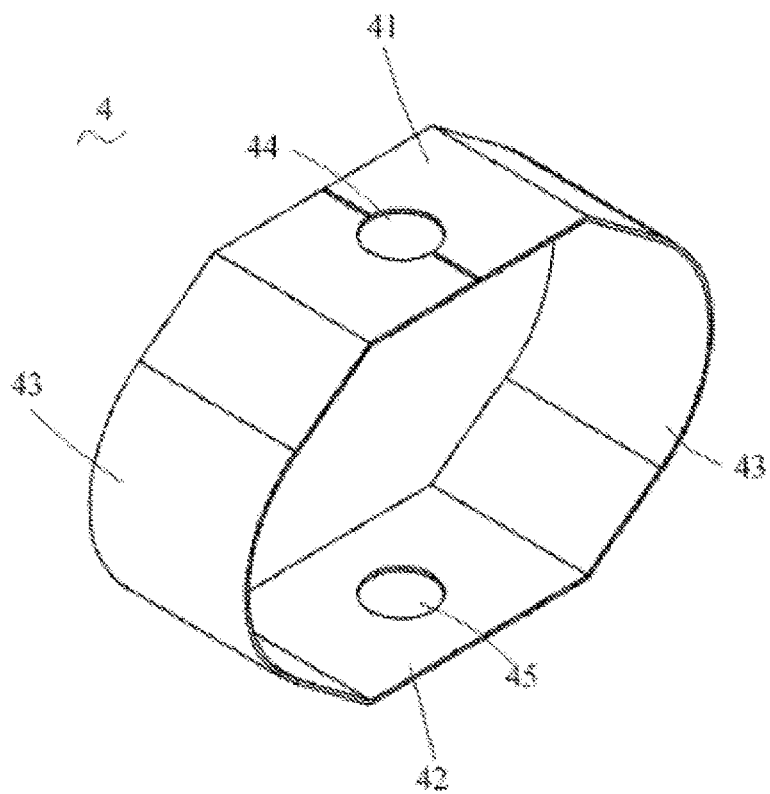
FIG. 8 is a schematic view of an elastic member in FIG. 1.
Figure 9:
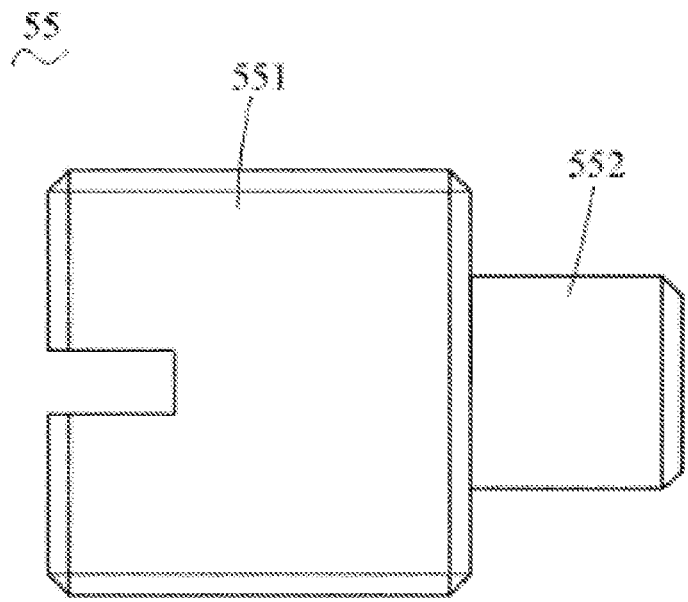
FIG. 9 is a schematic view of an adjustment screw in FIG. 1.

The invention will be further illustrated in more detail with reference to the accompanying drawings and embodiments. It is noted that, the following embodiments only are intended for purposes of illustration, but are not intended to limit the scope of the present invention.

Referring to FIGS. 1 to 9, in a preferred embodiment of the present invention, a one-dimensional large-stroke precise positioning platform 100 includes a housing 1, a cross ball guiding rail 2 arranged at one side of the housing 1, and a piezoelectric ceramic 3 and an elastic member 4 which are arranged inside the housing 1. A containing chamber 11 is provided in the housing 1. The housing 1 includes an upper end wall 12, and a lower end wall 13 opposite to each other, and two side end walls 14 opposite to each other. The containing chamber 11 is defined by the upper end wall 12, the lower end wall 13 and two side end walls 14. Grooves 15 are formed in the upper end wall 12. The groove 15 includes a horizontal surface 151 and a vertical surface 152 perpendicular to each other. A channel 16 is opened on the upper end wall 12, the channel 16 is extended from a rear end face 121 of the upper end wall 12 to a front end face 122 of the upper end wall 12, and is extended downwards from the horizontal surface 151 such that it is in communication with the containing chamber 11. A through-hole 17 is opened on the lower end wall 13 and the through-hole 17 is in communication with the containing chamber 11. The cross ball guiding rail 2 includes a mover guiding rail 21 and stator guiding rails 22 oppositely arranged at two sides of the mover guiding rail 21. The stator guiding rails 22 and the mover guiding rail 21 are parallel to each other. The stator guiding rails 22 are fixed on the upper end wall 12 of the housing 1, and are located in the groove 15 of the upper end wall 12. In this embodiment, the stator guiding rails 22 are fastened on the upper end wall 12 by fasteners 51. Screw holes 153 are opened on the vertical surface 152, and set screws 52 are provided in the screw holes 153. The set screw 52 is abutted against the stator guiding rail 22 of the cross ball guiding rail 2. The installation gap of the cross ball guiding rail 2 can be adjusted by the set screws 52, thereby adjusting the assembly error of the cross ball guiding rail 2 during assembly. The mover guiding rail 21 is located above the channel 16. The longitudinal extension direction of the mover guiding rail 21 is the same as the longitudinal extension direction of the channel 16.

The piezoelectric ceramic 3 and the elastic member 4 are disposed in the containing chamber 11. The containing chamber 11 has an inner bottom surface 111 and two inner side surfaces 112 opposite to each other which are perpendicular to the inner bottom surface 111. A first fixing member 61 and a second fixing member 62 are provided in the containing chamber 11. The first fixing member 61 and the second fixing member 62 are arranged along the longitudinal direction of the mover guiding rail 21, and the first fixing member 61 and the second fixing member 62 are movable in the containing chamber 11 along the longitudinal direction of the mover guiding rail 21. In the longitudinal direction of the mover guiding rail 21, one end of the piezoelectric ceramic 3 is abutted against the first fixing member 61, and the other end of the piezoelectric ceramic 3 is abutted against the second fixing member 62. The mover guiding rail 21 is fixed on the second fixing member 62, and the elastic member 4 is fixed on the first fixing member 61. In the width direction of the mover guiding rail 21, the two sides of the elastic member 4 are abutted against the inner side surfaces 112 of the containing chamber 11. The first fixing member 61 is connected with the second fixing member 62 by a flexible member 63. In this embodiment, the first fixing member 61 includes a first frame 611 and a first hollow cavity 612 formed in the first frame 611, the elastic member 4 is housed in the first hollow cavity 612. The first fixing member 61 is provided with an abutment portion 613 for abutting against the piezoelectric ceramic 3. The abutment portion 613 includes a protrusion protruding from the first frame 611 towards the piezoelectric ceramic 3. The flexible member 63 is provided on the abutment portion 613. In this embodiment, the flexible member 63 is a plate extending from the side surface of the abutment portion 613. The thickness of the plate 63 is designed based on the rigidity of the piezoelectric ceramic 3 to prevent excessive displacement loss of the piezoelectric ceramic 3. The cross-section of the abutment portion 613 is T-shaped. The head of the T-shaped abutment portion 613 is abutted against the piezoelectric ceramic 3 to increase the contact area between the piezoelectric ceramic 3 and the abutment portion 613. The second fixing member 62 includes a second frame 621 and a second hollow cavity 622 formed in the second frame 621. The piezoelectric ceramic 3 is housed in the second hollow cavity 622. The second frame 621 includes a top wall 623 and a bottom wall 624 opposite to each other, and two side walls 625 extending downwards from the top wall 623 to connect the bottom wall 624, and a rear wall 626 for connecting the top wall 623, the bottom wall 624 and the two side walls 625. The second frame 621 has an opening 627 facing the first frame 611, and the opening 627 is opposite to the rear wall 626. The abutment portion 613 extends from the opening 627 into the second hollow cavity 622 so that the entire structure is more compact and highly integrated. In this embodiment, there are two plates 63 which extend outwards from the two side surfaces of the abutment portion 613, and the two plates 63 are connected with the two side walls 625 of the second frame 621 respectively. In some other embodiments, there may be any number of the plates 63, such that they can be connected with all of the top wall 623, the bottom wall 624 and the two side walls 625 of the second fixing member 62, or alternatively, they can be connected with any one of the top wall 623, the bottom wall 624 and the two side walls 625, or alternatively they can be connected with any three of the top wall 623, the bottom wall 624 and the two side walls 625. In this embodiment, the flexible member 63 only is connected with the two side walls 625, comparing to that the plate 63 is connected with all of the top wall 623, the bottom wall 624 and the two side walls 625 of the second fixing member 62, or alternatively connected with any three of the top wall 623, the bottom wall 624 and the two side walls 625, the movement between the first fixing member 61 and the second fixing member 62 is more agile, this is helpful to prevent excessive displacement loss of the piezoelectric ceramic 3. Comparing to that the plate 63 is only connected with one of the top wall 623, the bottom wall 624 and the two side walls 625 of the second fixing member 62, the movement between the first fixing member 61 and the second fixing member 62 is more stable. Pre-tensioning screw holes 627 is opened on the rear wall 626 of the first housing 1, the top wall 623 of the first housing 1 is extended into the channel 16, and the mover guiding rail 21 is fixed on the top wall 623 by screws 53. The first fixing member 61, the second fixing member 62 and the flexible member 63 are disposed in the containing chamber 11 as an integral unit, called flexible frame 6. The flexible frame 6 is made of 7075 aluminum alloy. The flexible frame 6 can provide a pretension force to the piezoelectric ceramic 3, and avoid the piezoelectric ceramic 3 bearing a pulling force, thereby extending the usage life of the piezoelectric ceramic 3, eliminating the transmission gap and transmit the displacement caused by elongation of the piezoelectric ceramic 3 when the piezoelectric ceramic 3 is energizing.

In this embodiment, the elastic member 4 is an O-shaped spring leaf. The O-shaped spring leaf 4 includes a first planar segment 41 and a second planar segment 42 and two arc segments 43 connecting the first planar segment 41 with the second planar segment 42. In the height direction of the stator guiding rail 22, the first planar segment 41 and the second planar segment 42 are the upper side and the lower side of the O-shaped spring leaf 4 respectively. The two arc segments 43 are mirror-imaged to each other. The two arc segments 43 are abutted against two inner side surfaces 112 of the containing chamber 11 to provide friction which is necessary for the movement of the one-dimensional large-stroke precise positioning platform 100. A mounting hole 44 and an adjusting hole 45 are opened on the first planar segment 41 and the second planar segment 42 of the O-shaped spring leaf 4 respectively. The second fixing member 62 is provided with a positioning screw 54 installed in the mounting hole 44 and an adjustment screw 55 installed in the adjusting hole 45 thereon. A fixed block 7 is provided in the O-shaped spring leaf 4, and the fixed block 7 is abutted against the O-shaped spring leaf 4. The positioning screw 54 is threadedly connected with the fixed block 7. In this embodiment, the adjustment screw 55 has a threaded section 551 fixed on the second fixing member 62 and a boss 552 extending into the adjusting hole 45. By the clearance fit between the boss 552 and the adjusting hole 45, the adjustment screw 55 not only can adjust the deformation and pretension of the O-shaped spring leaf 4 such that the platform is in the optimal operating state, but also has a function of position limiting. When the O-shaped spring leaf 4 is pressed upwards by the adjustment screw 55, the O-shaped spring leaf 4 will spread in the horizontal direction, such that the two inner side surfaces 112 of the containing chamber 11 is pressed, thereby increasing the friction between the O-shaped spring leaf 4 and the housing 1. When the adjustment screw 55 is released downwards, the positive pressure between the O-shaped spring leaf 4 and the two inner side surfaces 112 of the containing chamber 11 is decreased, and thus the friction between them also is decreased, and the friction can be adjusted. Furthermore, a through-hole 17 is opened on the lower end wall 13 and the through-hole 17 is in communication with the containing chamber 11, such that the one-dimensional large-stroke precise positioning platform 100 can be adjusted into the optimal operating state without disassembly. In this embodiment, the O-shaped spring leaf 4 is made of 65 Mn by bending, and 65 Mn has excellent wear resistance and elasticity, and has a thickness of 0.2 mm.

The piezoelectric ceramic 3 has a first abutment surface 31 for abutting against the abutment portion 613 of the first fixing member 61 and a second abutment surface 32 for abutting against the rear wall 626 of the second fixing member 62. A pre-tensioning screw 56 is provided at one side of the piezoelectric ceramic 3. The pre-tensioning screw 56 is installed in the pre-tensioning screw hole 627 and is abutted against the second abutment surface 32. The pre-tensioning screw 56 can provide a pre-tension force to the piezoelectric ceramic 3, so that the usage life of the piezoelectric ceramic 3 can be extended. During assembly, the pre-tension force should not be too large, to prevent the damage or failure of the flexible frame 6. A gasket 8 is clamped between the pre-tensioning screw 56 and the piezoelectric ceramic 3. The damage to the piezoelectric ceramic 3 caused by the pre-tensioning screw 56 in the process of adjusting the pretension force can be prevented by the gasket 8. The pre-tensioning screw 56 is threadedly connected on the second fixing member 62, and the gasket 8 is clamped between the pre-tensioning screw 56 and the second abutment surface 32 of the piezoelectric ceramic 3. In this embodiment, the pre-tensioning screw 56 is abutted against the second abutment surface 32 to achieve the adjustment of the piezoelectric ceramic 3. In other embodiments, the pre-tensioning screw 56 also may be abutted against the first abutment surface 31 to achieve the adjustment of the piezoelectric ceramic 3.

Figure 10:
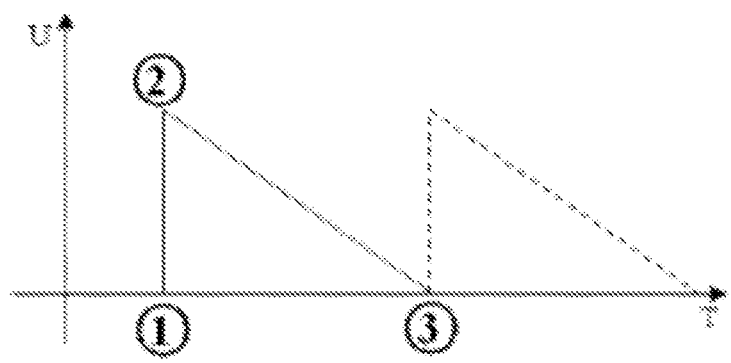
FIG. 10 is a schematic view of inputted saw-tooth wave when the one-dimensional large-stroke precise positioning platform is moving.

The one-dimensional large-stroke precise positioning platform 100 is a cross-scale precise positioning platform that not only can meet the nanoscale positioning precision, but also realize millimeter scale movement stroke. In order to meet these requirements, the one-dimensional large-stroke precise positioning platform 100 employs two operating modes, i.e., stepping mode and scanning mode. The stepping mode can realize large-stroke movement, and the scanning mode can realize nanoscale precise positioning. Referring to FIG. 1 to FIG. 10, the working process of the one-dimensional large-stroke precise positioning platform 100 is as follows: when saw-tooth wave as shown in FIG. 10 is inputted to the piezoelectric ceramic 3, the one-dimensional large-stroke precise positioning platform 100 gets into its operating state. When the piezoelectric ceramic 3 is driven by the step signals ①-② to move at a very high accelerated velocity, the piezoelectric ceramic 3 can transmit the step displacement by the flexible frame 6, the mover guiding rail 21 of the cross ball guiding rail 2 and the O-shaped spring leaf 4 can generate different slight displacements in opposite directions, and the sum of the displacements of the mover guiding rail 21 of the cross ball guiding rail 2 and the O-shaped spring leaf 4 is the deformation amount of the piezoelectric ceramic 3. When the drive signal applied onto the piezoelectric ceramic 3 is saw-tooth wave slope ②-③, the piezoelectric ceramic 3 slowly shortens, the flexible frame 6 gradually restores its original shape, the O-shaped spring leaf 4 can stay at its original position under the action of friction, the mover guiding rail 21 of the cross ball guiding rail 2 moves towards the O-shaped spring leaf 4 under the traction of the flexible frame 6, thereby realizing a movement cycle. By repeating the above movement procedure, the accumulation of single step displacements can be realized, and thus the cross-scale movement can be achieved. When the mover guiding rail 21 of the cross ball guiding rail 2 approaches a target position, and falls into the maximum deformation range of the piezoelectric ceramic 3, the operating mode can be switched into the scanning movement mode. By controlling the piezoelectric ceramic 3 to slowly move using electrical signals with small slope, the O-shaped spring leaf 4 can move together with the piezoelectric ceramic 3 under the action of static friction to achieve precise positioning. Moreover, in any operating state of the one-dimensional large-stroke precise positioning platform 100, the O-shaped spring leaf 4 keeps in contact with the housing 1 and there is large friction, thus, when the one-dimensional large-stroke precise positioning platform 100 is powered off, it will be in a self-locked state.

In the invention, there is a friction force between the O-shaped spring leaf 4 and the housing 1, and the first frame 611, the second frame 621 and the motion parts of the cross ball guiding rail 2 act as an inertia mass block. When the piezoelectric ceramic 3 is excited by voltage to stretch rapidly, the inertia force is transmitted to the first frame 611 by the piezoelectric ceramic 3 and thus applied on the O-shaped spring leaf 4, thereby the friction force is overcome and the overall movement is achieved.

In summary, by employing the cooperation among the cross ball guiding rail 2, the elastic member 4 and the piezoelectric ceramic 3, as well as the connection via a flexible member, the one-dimensional large-stroke precise positioning platform 100 of the present invention can solve the problems such as poor step consistency, losing step, low retention force, movement performance greatly affected by load and the like in the existing precise positioning platforms, and can realize nanoscale positioning precision and millimeter scale movement stroke. Besides, because the flexible frame 6 is disposed in the containing chamber 11, and the piezoelectric ceramic 3 and the O-shaped spring leaf 4 are disposed in the first fixing member 61 and the second fixing member 62 respectively, the entire structure of the one-dimensional large-stroke precise positioning platform 100 can be more compact in size and highly integrated. The one-dimensional large-stroke precise positioning platform 100 is applicable in the situation that is confined in space and needs high positioning precision requirement.

The above description is only preferred embodiments of the present invention and not intended to limit the present invention, it should be noted that those of ordinary skill in the art can further make various modifications and variations without departing from the technical principles of the present invention, and these modifications and variations also should be considered to be within the scope of protection of the present invention.

What is claimed is:

1. A one-dimensional large-stroke precise positioning platform, comprising:
   a housing;
   a cross ball guiding rail arranged at one side of the housing, the cross ball guiding rail comprising a mover guiding rail and stator guiding rails oppositely arranged at two sides of the mover guiding rail; the stator guiding rails being parallel to the mover guiding rail, and the stator guiding rails being fixed on the housing
   a piezoelectric ceramic and an elastic member disposed within the housing;
   a containing chamber disposed within the housing for containing the piezoelectric ceramic and the elastic member, a first fixing member and a second fixing member being provided in the containing chamber, and the first fixing member and the second fixing member being movable in the containing chamber along the longitudinal direction of the mover guiding rail;
   wherein in the longitudinal direction of the mover guiding rail, one end of the piezoelectric ceramic is abutted against the first fixing member, and the other end of the piezoelectric ceramic is abutted against the second fixing member, the mover guiding rail being fixed on the second fixing member, and the elastic member being fixed on the first fixing member;
   in the width direction of the mover guiding rail, the two sides of the elastic member are abutted against the inner side surfaces of the containing chamber, and the first fixing member being connected with the second fixing member by a flexible member.

2. The one-dimensional large-stroke precise positioning platform as claimed in claim 1, wherein the piezoelectric ceramic has a first abutment surface for abutting against the first fixing member and a second abutment surface for abutting against the second fixing member, a pre-tensioning screw being provided at one side of the piezoelectric ceramic for abutting against the first abutment surface or the second abutment surface.

3. The one-dimensional large-stroke precise positioning platform as claimed in claim 2, wherein a gasket is clamped between the pre-tensioning screw and the piezoelectric ceramic.

4. The one-dimensional large-stroke precise positioning platform as claimed in claim 3, wherein the pre-tensioning screw is threadedly connected on the second fixing member, and the gasket being clamped between the pre-tensioning screw and the second abutment surface of the piezoelectric ceramic.

5. The one-dimensional large-stroke precise positioning platform as claimed in claim 1, wherein in the height direction of the stator guiding rail, a mounting hole and an adjusting hole are opened at the two opposite sides of the elastic member respectively, and the first fixing member being provided with a positioning screw installed in the mounting hole and an adjustment screw installed in the adjusting hole thereon.

6. The one-dimensional large-stroke precise positioning platform as claimed in claim 1, wherein the first fixing member includes a first frame and a first hollow cavity formed in the first frame, the elastic member being contained in the first hollow cavity, the first fixing member being provided with an abutment portion for abutting against the piezoelectric ceramic, the abutment portion comprising a protrusion protruding from the first frame towards the piezoelectric ceramic, and the flexible member being provided on the abutment portion.

7. The one-dimensional large-stroke precise positioning platform as claimed in claim 6, wherein the flexible member is a plate extending outwards from the side surface of the abutment portion.

8. The one-dimensional large-stroke precise positioning platform as claimed in claim 7, wherein the second fixing member comprises a second frame and a second hollow cavity formed in the second frame, the piezoelectric ceramic being contained in the second hollow cavity, the second frame comprising a top wall and a bottom wall opposite to each other and two side walls extending downwards from the top wall, the second frame having an opening facing the first frame, the abutment portion extending from the opening into the second hollow cavity.

9. The one-dimensional large-stroke precise positioning platform as claimed in claim 8, wherein there are two plates which extends outwards from the two side surfaces of the abutment portion, and the two plates being connected with the two side walls of the second frame respectively.

10. The one-dimensional large-stroke precise positioning platform as claimed in claim 1, wherein the housing comprising an upper end wall and a lower end wall opposite to each other, the stator guiding rail being fixed on the upper end wall on which a channel being opened, the mover guiding rail being located above the channel, a through hole being opened on the lower end wall and the through hole being in communication with the containing chamber.

* * * * *